(12) United States Patent
Santo

(10) Patent No.: US 11,499,291 B2
(45) Date of Patent: Nov. 15, 2022

(54) WORK MACHINE

(71) Applicant: Jonas Heinzler, Sauldorf (DE)

(72) Inventor: Wilfried Santo, Lörrach-Hauingen (DE)

(73) Assignee: Jonas Heinzler, Sauldorf (DE)

(*) Notice: Subject to any disclaimer, the term of this patent is extended or adjusted under 35 U.S.C. 154(b) by 576 days.

(21) Appl. No.: 16/479,302

(22) PCT Filed: Jan. 18, 2018

(86) PCT No.: PCT/EP2018/051143
§ 371 (c)(1),
(2) Date: Jul. 19, 2019

(87) PCT Pub. No.: WO2018/134276
PCT Pub. Date: Jul. 26, 2018

(65) Prior Publication Data
US 2019/0382982 A1    Dec. 19, 2019

(30) Foreign Application Priority Data

Jan. 19, 2017  (DE) ............... 10 2017 100 963.9

(51) Int. Cl.
*E02F 9/18* (2006.01)
*E02F 3/34* (2006.01)
(Continued)

(52) U.S. Cl.
CPC .............. *E02F 9/18* (2013.01); *B62D 49/085* (2013.01); *E02F 3/34* (2013.01); *E02F 9/2037* (2013.01)

(58) Field of Classification Search
CPC .... B62D 49/085; B62D 61/065; B62D 37/04; B62D 21/14; E02F 9/0841; E02F 3/34; E02F 9/2037
(Continued)

(56) References Cited

U.S. PATENT DOCUMENTS 2,766,850 A * 10/1956 Marnon .............. B66F 9/07554
                                                         212/196
3,021,625 A *  2/1962 Stasse ..................... B62B 1/24
                                                         180/19.1
(Continued)

FOREIGN PATENT DOCUMENTS

DE         202008006289 U1    9/2008
DE         102011105522 A1 * 12/2012 ............. B66C 23/76

OTHER PUBLICATIONS

International application No. PCT/EP2018/051143 dated May 7, 2018.
(Continued)

*Primary Examiner* — Paul N Dickson
*Assistant Examiner* — Caitlin Anne Miller
(74) *Attorney, Agent, or Firm* — Bachman & LaPointe, P.C.

(57) ABSTRACT

The invention relates to a work machine (1, 1.1, 1.2) comprising: a work unit (2, 2.1, 2.2) or a receptacle (16) for a work unit, exactly one primary vehicle axis (3), wheel elements (4) arranged on both sides of the primary vehicle axis (3), drive units associated with the wheel elements (4), at least one control, wherein the control comprises at least one control circuit and effects a self-balancing of the work machine (1, 1.1, 1.2) about the main vehicle axis (3), and a counter-weight (5), wherein a position of the counter-weight (5) relative to the primary vehicle axis (3) is controllable via the control, and therefore the work machine (1, 1.1, 1.2) can be balanced about the primary vehicle axis (3) and controlled in the movement directions thereof via a position shift of the counter-weight (5).

15 Claims, 9 Drawing Sheets

(51) Int. Cl.
*E02F 9/20* (2006.01)
*B62D 49/08* (2006.01)

(58) Field of Classification Search
USPC .......................................................... 280/758
See application file for complete search history.

(56) References Cited

U.S. PATENT DOCUMENTS

| | | | | |
|---|---|---|---|---|
| 4,299,530 | A | * | 11/1981 | Schaeff ................ B62D 49/085 414/673 |
| 4,941,798 | A | * | 7/1990 | Meier ........................ B66C 1/24 294/93 |
| 5,685,563 | A | * | 11/1997 | Ottestad .................. B60R 21/13 212/196 |
| 6,841,974 | B2 | * | 1/2005 | Dykeman ............ H02J 7/00711 320/141 |
| 8,931,189 | B2 | * | 1/2015 | Jones ...................... E02F 3/961 37/442 |
| 2009/0206589 | A1 | * | 8/2009 | Osswald ................ B62D 21/14 187/234 |
| 2012/0285757 | A1 | * | 11/2012 | Atarashi ................ B60K 11/04 903/903 |
| 2020/0391642 | A1 | * | 12/2020 | Brown .................... B60P 1/283 |

OTHER PUBLICATIONS

European office action for patent application No. 18 704 412.8-1009 dated Oct. 30, 2020.

* cited by examiner

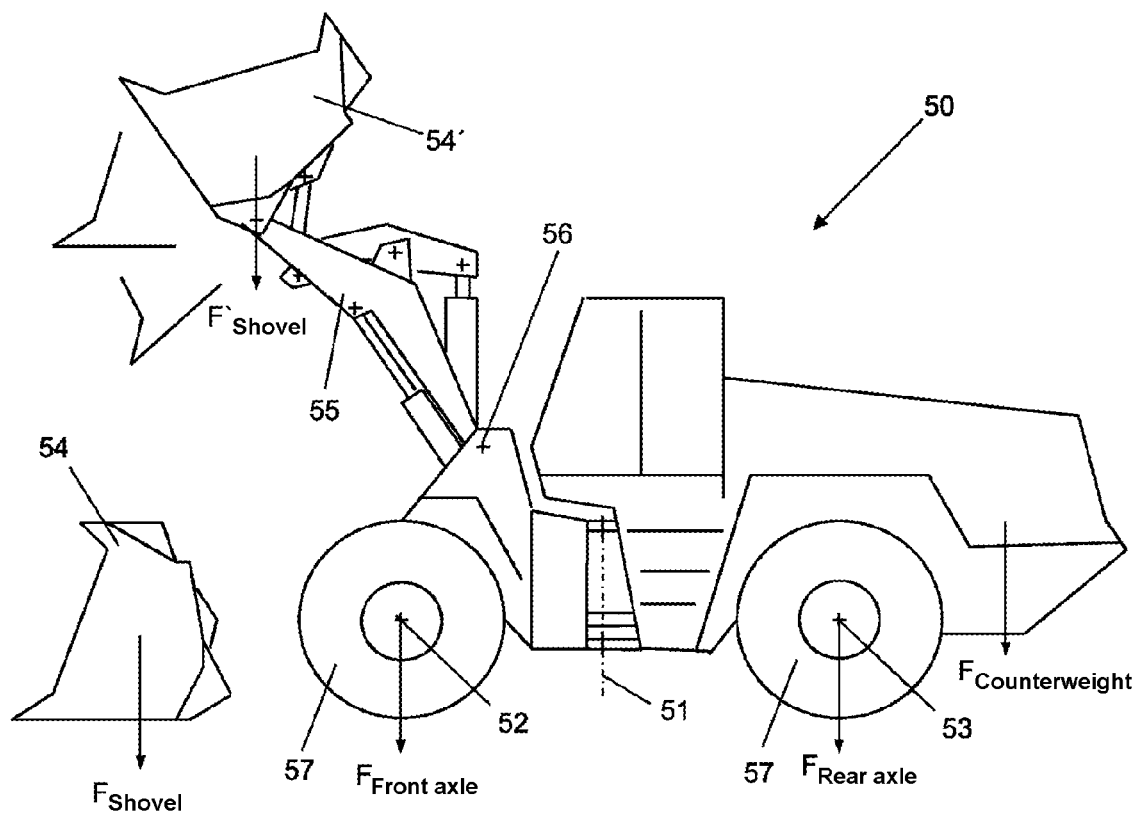
Figure 1 - Prior art
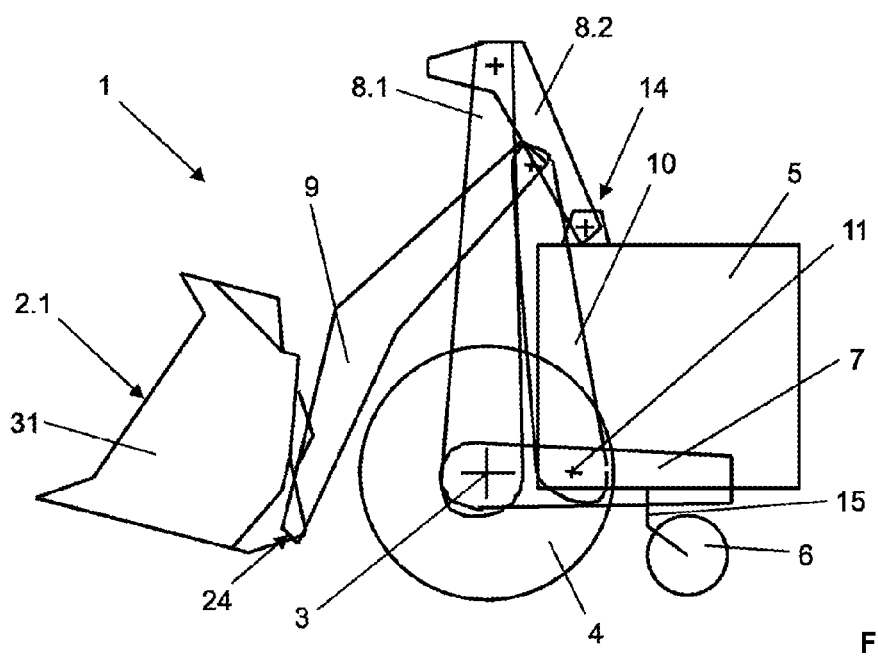
Figure 2

WORK MACHINE

TECHNICAL FIELD

The invention relates to a work machine.

PRIOR ART

Various work machines, such as for example wheel loaders, which have two axles are known from the prior art. Depending on the position of the center of gravity, in such work machines the load is distributed between the two axles with a certain ratio. In order to steer the vehicle, in most cases either the wheels on one or on both axles have to be pivoted in, or the frame has a articulated joint (see FIG. 1) to which the wheels are rigidly attached to the axles, and the steering takes place via the bending in of the vehicle frame.

A further embodiment is provided by so-called skid steers in which all four wheels are driven, wherein the drives of the wheels on one side of the vehicle are rigidly coupled to one another and each side of the vehicle has a separate drive. As a result, a steering movement can be generated similarly to in track vehicles in that the two sides are driven with a different rotational speed. The disadvantage with skid-steer steering systems is, however, that the wheels have to be shifted laterally and therefore no longer follow their own rolling direction. As a result, drive energy is consumed and excessively increased tire wear is generated, for which reasons such steering systems can be used only for relatively small loaders.

In the work machines/vehicles specified above with at least two axles, the load is distributed between the axles depending on the center of gravity of the vehicle with respect to the distance of the center of gravity of the vehicle from the wheels. Therefore, the axles and wheels of the work machines are generally dimensioned in such a way that they can take up even relatively large loads. Furthermore, the axles and the wheels of these work machines are dimensioned in such a way that all the shifting of the center of gravity of the vehicle which occurs during normal operation, for example as a result of a load take-up in a shovel of a wheel loader, and all the dynamic forces which occur, caused for example by a braking process, have to be absorbed by the displacement of the wheel load distribution without the stable equilibrium being lost. In the case of a wheel loader, for example, the loaded shovel generates an additional force which lies far outside a tilting axis of the front axle. Furthermore, when the shovel is being filled the loader can apply so-called breakaway torques, in order to release the material to be loaded from the heap or from the wall.

In order to ensure a stable attitude of the vehicle in such load situations, in the work machines a counterweight is attached to the opposite end of the vehicle to the end with the attached implement, or the vehicle comprises a counterweight in the region of the end opposite the implement. In the case of a wheel loader, the counterweight is by way of example generally attached in a region behind a rear axle of the wheel loader, in the region of a vehicle end of the wheel loader, at the greatest possible distance from the front axle.

This results in the disadvantage that the axles, wheels and the hydraulic system or motors for actuating the implements have to be given very large or powerful dimensions in order to achieve sufficient stability and usability of the work machines. In this context, the axles must, for example in the case of a wheel loader, be dimensioned in such a way that, firstly, the rear axle can take up the weight of the counterweight in the idle state of the shovel, and, secondly, the front axle can take up the weight loading it, which weight can arise, for example, when solid material breaks away from a wall, for example in a quarry. In this context, it is additionally necessary to pay attention to protection against tilting of the work machine for the driving mode, so that overall the axles, the wheels and the motors or hydraulic system for actuating the implements have to generally be given such large dimensions that the work machines only have very poor load-to-load unladen weight ratios. This gives rise, inter alia, to a very high consumption of primary energy carriers by these work machines.

Furthermore, various single-axle vehicles are also known from the prior art. For example, self-balancing single-axle electric scooters (so-called Segways) are known which constitute essentially an inverse pendulum in which balancing is not carried out by the rider but rather by an electronic control system which attempts to continuously keep the center of gravity above the axle. A disadvantage with this control system is that consequently it is not possible to attach any attachments or load to such a single-axle electric scooter, since they would cause the center of gravity to be shifted to a high degree and subsequently the fundamental control system for balancing would use the shifting of the center of gravity to control the acceleration. Although DE 20 208 006 289 U1 has disclosed an adapter system for attaching a trolley to a self-balancing single-axle electric scooter, decoupling from the control system for self-balancing is performed by means of or via the adapter system.

Consequently, such a single-axle electric scooter cannot be used as a work machine or as a carrier vehicle of implements such as, for example, a wheel loader shovel or a plow, since these attachments always bring about shifting of the center of gravity and subsequent disruption of the state of equilibrium.

Furthermore, single-axle equipment carriers for receiving various implements are known from agriculture, said single-axle carriers not being self-balancing. In such single-axle equipment carriers which are used, for example, in mountainous regions for cultivating steep slopes, the implement serves as a further support point which provides the work machine with the necessary stability.

SUMMARY OF THE INVENTION

The object of the present invention is to overcome the disadvantages from the prior art. In particular, the object of the invention is to provide a work machine/a vehicle which is suitable for carrying out the tasks which are customary today for work machines and at the same time has a high degree of maneuverability and flexibility. Moreover, an object of the invention is to make available a work machine/a vehicle which has a lower weight with the same performance as well as a higher degree of agility and a lower part density. Moreover, an object of the invention is to provide a work machine/a vehicle which is intended to be usable as a base carrier vehicle for various implements. In addition, an object of the invention is to make available a work machine/vehicle with which an increase in productivity is to be made possible and which additionally meets modern ecological requirements.

The features as disclosed herein result in the object being achieved. Advantageous refinements are also described herein and in the dependent claims.

A work machine according to the invention comprises an implement or a mount for an implement. Furthermore, the work machine according to the invention comprises precisely one primary vehicle axle, wherein wheel elements are arranged on both sides on the primary vehicle axle. The wheel elements which are arranged on both sides on the primary vehicle axle are each assigned a separate drive unit. Furthermore, the work machine according to the invention comprises at least one controller which comprises at least one closed-loop control circuit. The closed-loop control circuit of the controller is used to enable the work machine to orient itself about the primary vehicle axle in a self-balancing fashion. Furthermore, the work machine according to the invention comprises a counterweight in order to compensate a weight of the implement or of the implement attached to the mount. The position of the counterweight can be controlled relative to the primary vehicle axle by means of the controller, so that the work machine can be balanced about the primary vehicle axle by shifting the position of the counterweight relative to the primary vehicle axle. Moreover, the working machine can be controlled in its movement directions by shifting the position of the counterweight with respect to the primary vehicle axle, which brings about shifting of the center of gravity of the vehicle.

A work machine according to the invention therefore has, in contrast to a work machine from the prior art, just one primary vehicle axle which always bears the main load during operation. This provides the advantage that it is possible to dispense with an articulated axle or an articulated steering system such as are used in the prior art, since the steering is carried out by means of actuation of the drives of the respective wheel elements which are arranged on both sides of the main axle.

The steering is carried out here as in a self-balancing electronic scooter which is known from the prior art and in which the wheel elements can be actuated with a different drive speed and drive direction by means of their assigned drive. This provides the advantage that the work machine according to the invention has, in contrast to work machines from the prior art, a very high level of agility and maneuverability, since even turning on the spot is made possible by a drive of the wheel elements in opposite rotational directions.

In order to compensate a load which is applied dynamically by the implement outside the range of the main axle and to keep the overall center of gravity of the vehicle above the primary vehicle axle, here the counterweight can be shifted in the longitudinal direction by means of the controller with the closed-loop circuit in such a way that the center of gravity is located above the main axle and the work machine is therefore balanced. Since the counterweight is shifted in a direction in which the work machine is to be moved, the work machine can be moved in this direction according to the same system as in the case of a self-balancing electronic scooter. In this context, the controller generates a torque at the drives of the wheel elements in order to counteract the shifting of the center of gravity, as a result of which the vehicle moves in the direction of the shifting of the center of gravity. In order to brake the vehicle again, the counterweight is moved counter to the direction of travel until the work machine comes to a standstill.

In one exemplary embodiment, the counterweight can be shifted further in a direction of the primary vehicle axle in order to stabilize the vehicle during cornering about the longitudinal axis of the work machine as a result of the lateral shifting.

In one typical exemplary embodiment, the primary vehicle axle is arranged with the wheel elements and the associated drive elements on a base element which comprises inclination sensors, in particular digital semiconductor gyroscopes. The information sensors are assigned here to the control circuit of the controller of the work machine, which is preferably an electronic closed-loop control circuit which, apart from the inclination sensors, can also comprise load sensors. Furthermore, the controller can also comprise acceleration sensors so that in addition to the data of the inclination sensors the further data of the acceleration sensors can be used for balancing the work machine.

In one exemplary embodiment, an auxiliary wheel can also be arranged in and/or on the counterweight on the work machine according to the invention. The advantage of such an auxiliary wheel is that it can permit, for example, load peaks to be absorbed. Such load peaks can arise, for example, when the work machine uses a shovel as an implement for breaking up material, for example in the wall of a quarry or when unloading the shovel when the load suddenly becomes smaller on the shovel as a result of the dropping out of loaded material. For this, in one exemplary embodiment the auxiliary wheel can be used as an additional support element in that the controller permits a small load also to load the auxiliary wheel so that the center of gravity can briefly (in particular during a loading process) lie in a location which is shifted for a short time outside the main vehicle axle, toward the counterweight. In addition, the auxiliary wheel can prevent the counterweight from impacting on the ground as a result of the sudden shifting of the center of gravity (for example during the discharging of the shovel) of the work machine or, in the event of such a sudden required shifting of position, from dragging along the ground. It is therefore an advantage of the auxiliary wheel that it can be used as an additional support point for the work machine in particular when loading and unloading, during which sudden load peaks and resulting shifting of the center of gravity can occur. However, it is to be noted that the main load is always to be borne by the primary vehicle axle so that the auxiliary wheel and its bearing/suspension in and/or from the counterweight only have to be dimensioned for low loads.

Furthermore, the auxiliary wheel can, for example, prevent the weight for sitting down on the ground during emergency braking of the work machine during which the counterweight of the work machine has to be suddenly moved counter to a direction of travel of the work machine.

In one typical embodiment, the counterweight comprises an energy store and/or a motor for converting energy. A motor for converting energy can be, for example, an internal combustion engine such as is known from the prior art. Furthermore, further known devices for converting energy such as, for example, hydraulic pumps, are also included. The energy store can be, for example, accumulators for storing electrical energy. With the energy which is provided by the energy store and/or the motor for converting energy it is possible to use not only the drive units of the wheel elements but also hydraulic motors and/or pumps for controlling the shifting of the counterweight and/or of the implement.

In one typical exemplary embodiment, the drive units of the wheel elements on the primary vehicle axle are electric motors which convert electrical energy provided by the energy store and/or the motor for converting energy, into kinetic energy. Furthermore, the drive units can be hydraulic motors.

In addition, in one exemplary embodiment the wheel elements of the drive machine can comprise brake units. This provides the advantage that, for example during loading/unloading of the implement of the work machine the main vehicle axle can be held in a spatially fixed position.

The necessary force in order to take up, for example, bulk material in a shovel or to break off material from a wall in a quarry is provided in such an exemplary embodiment only by a movement of the implement and not by movement of the entire work machine as is the case, for example, in wheel loaders from the prior art. During such a loading or unloading process during which the primary vehicle axle is held in a spatially fixed position by the brake units, the self-balancing of the work machine occurs only by means of a method/a shifting of a position of the counterweight.

In one typical exemplary embodiment, the counterweight of the work machine is connected to the base element via at least two lever elements. The at least two lever elements form here a two-part arm which permits shifting of the counterweight along the longitudinal axis of the work machine. In order to hold the counterweight in an essentially horizontal attitude, the lever elements and the counter weight interact with a hydraulic control system. The hydraulic control system can comprise here various element such as a hydraulic cylinder which during shifting of the counterweight orients a position of the counterweight with respect to the lever elements in such a way that the counterweight is located in an essentially horizontal attitude so that elements of the work machine which are accommodated in the counterweight, such as, for example, the motor for converting energy, hydraulic pumps and/or further storage elements, drive elements or control elements, can operate free of disruption and their function cannot be adversely affected by any oblique position whatsoever.

In a further exemplary embodiment, the lever elements are operatively connected to further auxiliary lever elements, so that the lever elements and the auxiliary lever elements generate a parallelogram guide. This also can bring about a situation in which the horizontal attitude of the counterweight does not change during shifting along the longitudinal axis. The controller preferably also keeps the base element of the work machine in an essentially horizontal attitude by means of the inclination sensors (semiconductor gyroscopes), since by virtue of the parallelogram guide the position of the counterweight corresponds essentially to the position of the base element on which the lever elements and the auxiliary lever elements are arranged.

In further exemplary embodiments, instead of the lever elements the counterweight can be connected to the base element via a scissor element, wherein the scissor elements are mounted in a shiftable fashion on the base element and on the counterweight, so that shifting of ends of the scissor elements on the base element toward one another or away from one another occurs with respect to shifting to the counterweight along the longitudinal axis of the work machine away from the primary vehicle axle or toward it. A further possible way of connecting the counterweight in a shiftable fashion to the base element is to arrange the base element on a linear bearing which is arranged on the base element. Such a linear bearing can comprise, for example, guide rails on which the counterweight is mounted in a shiftable/displaceable fashion. In a further exemplary embodiment, it is additionally possible for a rigid longitudinal counterweight to be used and for the primary vehicle axle to be arranged on the rigid counterweight, in such a way that it can be shifted along the counterweight.

In one typical exemplary embodiment, the work machine also comprises a control element, so that the work machine has autonomous controllability or remote controllability. It is also possible for the work machine to have a driver's cab for a machine operator. However, the work machine is preferably remote-controlled or is self-propelling by means of the autonomous controller. One advantage of an autonomous controller or a remote controller of the work machine is that the vehicle can be operated more quickly and in a more agile way since any vibrations and shocks which can occur, in particular in off-road conditions such as in a quarry, are not passed on to a machine operator who is seated in a driver's cab. In order to permit autonomous self-driving or even remote-controllability from one point from which the work machine cannot be seen, the control element of the work machine preferably comprises cameras and/or sensor elements. In this context, various cameras and sensor elements such as are known from the field of control technology and of autonomous driving are used. Image cameras, infrared cameras, radar sensors and laser sensors are mentioned here only by way of example.

In one typical exemplary embodiment, the work machine comprises an implement or a mount for an implement. The mount for an implement can be, for example, various mounts. For example, it can be suspension devices or three-point linkages such as are known from the field of agricultural machines. Other mounts, which for example of the mounting of multi-part work elements such as are used, for example, in telescopic platforms or excavators, are possible.

In a further exemplary embodiment, the work machine comprises an implement which is preferably connected to the base element via a working arm and a pivoting arm. The two-part embodiment of the connection between the implement and the base element makes it possible, for example, for the wheels to be stationary during a loading or unloading process, and consequently to be held in a spatially fixed fashion. The necessary forces which have to be applied to an implement are generated in such a case exclusively by means of drive elements which are operatively connected to the implement, the working arm, the pivoting lever and the base element. Such drive elements can be, for example, electric motors which are assigned to the rotational axes between the individual elements or hydraulic elements such as hydraulic cylinders, which generate rotation of the elements with respect to one another.

In one preferred exemplary embodiment, the pivoting arm is mounted on the base element, behind the primary vehicle axle with respect to the implement. The mounting behind the primary vehicle axle generates the advantage that the implement can be pulled very far to the rear by means of the pivoting arm and the working arm, as a result of which the load can be moved very close to the primary vehicle axle. As a result, the counterweight can be shifted close to the primary vehicle axle so that the laden work machine is less large in size in a transport portion in comparison with vehicles from the prior art. In addition, this permits agile rotation about the vehicle's vertical axis without generating large, disruptive forces. A further advantage of the two-part embodiment composed of the pivoting arm and the working arm is that it permits the drive units of the wheel elements to be made smaller, since the force for taking up a load is applied by the drive elements which are assigned to the implement, the working arm, the pivoting lever and the base element or are operatively connected thereto.

A further advantage of this arrangement is that it permits a so-called pulse charging method. While in work machines from the prior art the necessary force is achieved by means of a continuous force which, for example, in a wheel loader by driving in the direction of the bulk material to be loaded, in the case of a pulse charging method the work machine is held in a spatially fixed fashion by the brake units of the wheel elements and momentum is generated only by rapid to and fro movement of the implement.

The work machine also preferably comprises a hydraulic accumulator which can be used both for the rapid application of high hydraulic pressures during the pulse charging method as well as for absorbing load peaks which require rapid extension or retraction of the counterweight and for this purpose a rapid provision or reduction of hydraulic pressure at the hydraulic elements. In the case of emergency braking operations, the hydraulic accumulator can also be used to permit rapid extension or retraction of the counterweight. By means of such a hydraulic accumulator which is given sufficiently large dimensions it is possible to make the hydraulic pumps for generating the hydraulic pressure smaller in terms of dimensions.

BRIEF DESCRIPTION OF THE DRAWINGS

Further advantages, features and details of the invention can be found in the following description of preferred exemplary embodiments and with reference to the drawings, in which:

FIG. 1 shows a work machine in the form of a wheel loader from the prior art;

FIG. 2 shows a schematic illustration of an exemplary embodiment of a work machine according to the invention with a shovel as an implement;

DETAILED DESCRIPTION

Figure 3:
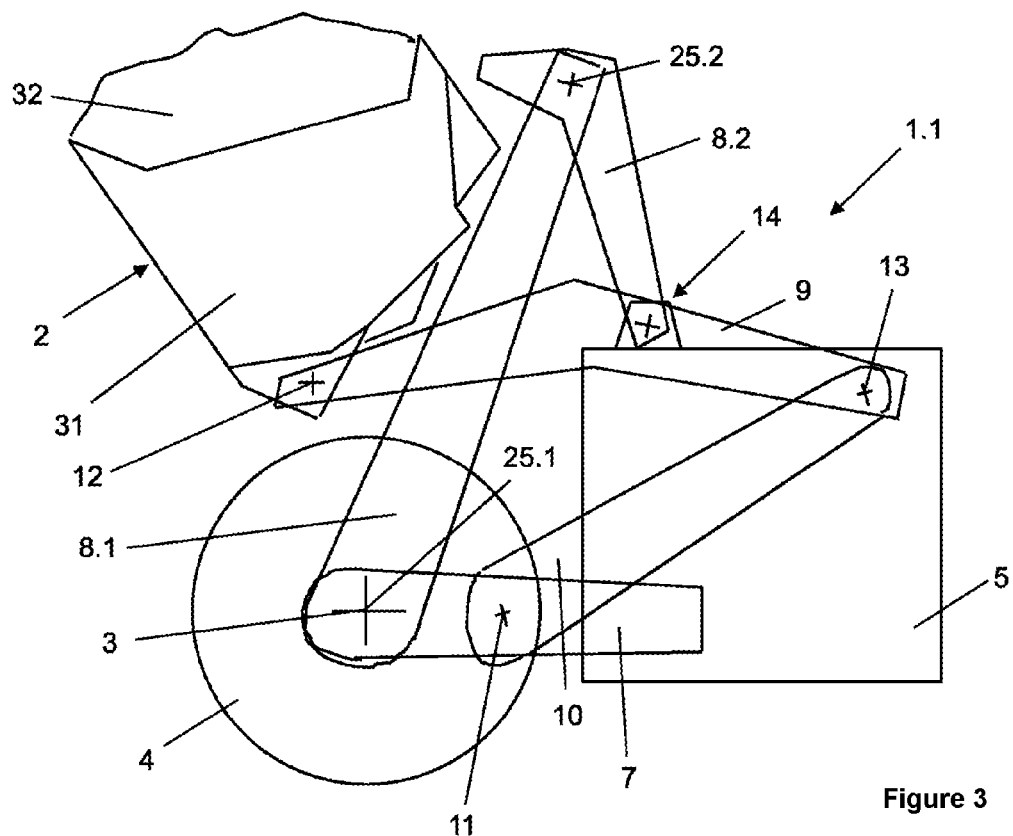
FIG. 3 shows a schematic illustration of an exemplary embodiment of a further work machine according to the invention with a shovel which is laden as an implement.

FIG. 1 illustrates a wheel loader 50 which corresponds to a work machine/a vehicle from the prior art. In the wheel loader 50, wheels 57 are rigidly attached to a front axle 52 and to a rear axle 53. In order to steer the vehicle, the frame has an articulated joint which can be bent in about a bending axis 51. Therefore, steering of the wheel loader 50 takes place by bending in the vehicle frame of the wheel loader 50. The wheel loader 50 in FIG. 1 also has, as an implement, a shovel 54 which is connected to the vehicle frame via a working arm 55. The working arm 55 is mounted so as to be rotatable about the rotational axis 56 here. The shovel 54 is illustrated in FIG. 1 both in a position in which it would lie on the ground (reference number 54) and in positions which can occur, for example, when unloading a load from the shovel into a transportation vehicle (reference number 54').

In order to prevent tilting of the wheel loader when the shovel 54, 54' is loaded, wheel loaders 50 from the prior art have a counterweight in the rear region. This is represented in FIG. 1 by $F_{counterweight}$. The counterweight or the resulting force $F_{counterweight}$ is generally configured in such a way that tilting over the front axle 52 is prevented with a safety factor of 2.0. In order to determine this tilting load, at which no load acts any more on the rear axle 53, it is assumed that the wheel loader 50 is located in a statically most unfavorable position, i.e. that a weight force $F_{shovel}$ is at the greatest distance from the front axle 52 which corresponds in the wheel loader 50 to a tipping axis, and the wheel loader 50 has a fully bent-in position of the articulated joint. Taking into account the safety factor of 2.0 this then results in a rated load which can be taken up in the shovel 54 of the wheel loader 50 and which corresponds to 50% of the tilting load. In order to prevent tilting, such work machines from the prior art must therefore be made very heavy and given very large dimensions owing to various possible working states which can occur.

For example, in the case of a wheel loader 50 which is intended to take up a 10 t payload in the shovel 54, the rear axle is dimensioned in such a way that in an empty state of the shovel 54 it is configured for a loader 17 t, since in the case of the empty shovel 54 a large part of the force $F_{counterweight}$ which is generated by the counterweight has to be diverted via the rear axle 53, and therefore this load acts on the rear axle 53. The front axle 52 is, secondly, configured in such a way that even solid material can be broken away from a wall with the shovel 54, wherein in such a load state it is assumed that as a result the rear axle 53 can be raised. It results from this that in the stated example the front axle 52 has to be configured for a load of 37 t. The unladen weight of such a wheel loader is 27 t in this example. With additional loading of the maximum rated load of 10 t the vehicle weight is therefore 37 t in the laden state. Owing to the preconditions described above, the front axle 52 and the rear axle 53 are, however, dimensioned in such a way that together they could take up a load of 54 t. This results in a situation in which both a drive and the various components such as axles, etc. of a wheel loader 50 from the prior art have to be embodied in a clearly overdimensioned fashion in comparison with a maximum vehicle load. The overdimensioning of the drives is also affected by the fact that the wheel loader 50 has to have sufficient traction in all driving situations. Consequently, the axles 52, 53 also have to be overdimensioned owing to their transmissible torque with different load distributions. A further disadvantage of the work machines/work vehicles from the prior art is that as a result of their structure/their design they generally have very low maneuverability and additionally high power losses as a result of the overdimensioning described above.

FIG. 2 illustrates a work machine 1 according to the invention which eliminates or at least minimizes the disadvantages of the work machines/work vehicles from the prior art. The work machine 1 according to the invention comprises merely one primary vehicle axle 3, on both sides of which wheel elements 4 are arranged. The wheel elements 4 are each assigned separate drive units by means of which self-balancing of the work machine 1 about the primary vehicle axle 3 is brought about by means of a controller which comprises at least one closed-loop control circuit. As a result, the work machine 1 has a lower number of parts and only the one primary vehicle axle 3, the wheel elements 3 arranged thereon and the associated drive units have to be configured for the various load states which can occur.

The work machine 1 in FIG. 2 also comprises an implement 2.1. The implement 2.1 of this exemplary embodiment is a shovel 31 which can correspond, for example, to the shovel 54 of the wheel loader 50 from the prior art. The shovel 31 is attached to an implement mount 24 by means of a pivoting arm 10, and a working arm 9 on a base element 7 of the work machine 1.

Furthermore, the work machine 1 comprises a counterweight 5. A position of the counterweight 5 with respect to the primary vehicle axle 3 can be controlled by means of the controller. The counterweight 5 is necessary for a work machine 1 according to the invention, since in the case of a vehicle which balances itself about a primary vehicle axle, like the work machine 1 according to the invention here, the center of gravity of the vehicle always has to be located above the primary vehicle axle and the counterweight is therefore used to compensate shifting of the center of gravity which is caused by the implement 2.1. Such a self-balancing work machine 1 corresponds to an inverse pendulum. Consequently, by means of shifting of the position of the counterweight 5 relative to the primary vehicle axle 3, the work machine 1 can, firstly, be balanced about the primary vehicle axle 3, and, secondly, it can be controlled in terms of its movement directions. Shifting of the position of the counterweight 5 out of the stable position leads to a situation in which the controller detects this shifting and the wheel elements 4 move in this direction in order to restore a counterbalance. This principle corresponds here to the self-balancing electric scooters which are known from the prior art and which are known by the tradename Segway, but for which it is not possible to attach implements owing to the lack of a counterweight.

In the exemplary embodiment shown in FIG. 2, the counterweight 5 is connected to the base element 7 via lever elements 8.1 and 8.2. Furthermore, an auxiliary wheel 6 is arranged on the counterweight 5 by means of an auxiliary wheel suspension 15. During loading/unloading of the shovel 31, the auxiliary wheel 6 can be set down on the ground in order, firstly, to make available an additional support point and, secondly, to absorb any load peaks which can arise, for example, as a result of breaking out of material from a wall. It is to be noted here that the main load always loads the primary vehicle axle 3.

FIG. 3 illustrates a further exemplary embodiment of a work machine 1.1 in which there is no auxiliary wheel arranged on the counterweight 5. The work machine 1.1 in FIG. 1 also has a shovel 31 as an implement 2. In the illustrated example, the shovel 31 is filled with loaded material 32. Furthermore, FIG. 3 illustrates a further advantage of the present invention, specifically that the implement 2 is connected to the base element 7 of the work machine 1.1 via the pivoting lever 10 and the working arm 9. The pivoting lever 10 is preferably arranged here behind a primary vehicle axle 3 so as to be rotatable about a pivoting arm rotational axis 11. The arrangement of the pivoting arm rotational axis 11 behind the primary vehicle axle 3 makes it possible for the shovel 31 to be moved more closely to the primary vehicle axle 3 in the loaded state. As a result, when the shovel 31 is loaded the counterweight 5 can also be moved close to the primary vehicle axle 3 by means of the lever elements 8.1 and 8.2, resulting in significantly smaller vehicle dimensions than in the case of a vehicle from the prior art as illustrated in FIG. 1. In addition, the work machine 1.1 is as a result significantly more agile and maneuverable than a work machine/a vehicle from the prior art.

Since the wheel elements 4 are each assigned a separate drive unit, which can be, for example, an electric motor, by rotating the wheel elements 4 in opposite directions it is even possible to turn the work machine 1.1 on the spot. The counterweight 5, the lever elements 8.1 and 8.2 and the pivoting arm 10 and the working arm 9 are arranged in a work machine 1.1 according to the invention and/or have such external contours that a position as illustrated in FIG. 3 is also made possible.

During loading or unloading of the implement 2 of the work machine 1.1, the shovel 31 and the working arm 9 and/or the working arm 9 and the pivoting arm 10 and/or the pivoting arm 10 can be adjusted with respect to one another relative to the base element 7 about the implement rotational axis 12, the working arm rotational axis 13 and/or the pivoting arm rotational axis 11. The drive elements can be, for example, electric motors or the rotation of the individual elements relative to one another occurs by means of hydraulic elements (not illustrated), such as for example hydraulic cylinders.

The loading of a shovel 31 of a work machine 1, as has been illustrated in FIG. 2, is illustrated below with reference to FIGS. 4a to 4k.

Figure 4A:
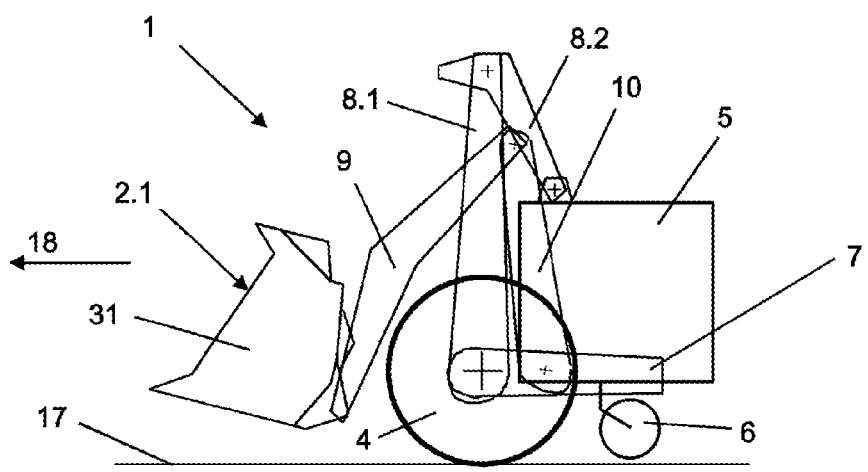
FIGS. 4a to 4k show a schematic illustration of a loading process of a shovel of the work machine according to FIG. 2.

FIG. 4a shows the work machine 1 in the position in which it is travelling on an underlying surface 17 in a travel direction 18. The auxiliary wheel 6 is not in contact with the underlying surface 17 here, that is to say is loadless in this state, in order to ensure rapid movability of the work machine 1. In one exemplary embodiment, the controller of the work machine comprises, in addition to the closed-loop control circuit for the self-balancing about the primary vehicle axle 3, also a further closed-loop control circuit for monitoring the load of the at least one auxiliary wheel 6. In the closed-loop control circuit for self-balancing of the work machine 1 about the primary vehicle axle 3, preferably inclination sensors, equilibrium sensors and/or acceleration sensors are used. In this context, for example semiconductor gyroscopes can be used as inclination sensors and equilibrium sensors. Furthermore, load sensors can be included in the closed-loop control circuit in order, for example, to determine a load acting on the shovel 31/the implement 2.1, and to shift the counterweight 5 correspondingly for the purpose of self-balancing.

Load sensors which measure a load on the at least one auxiliary wheel 6 are preferably used in the second closed-loop control circuit. By means of the controller, it is possible to control the shifting of the center of gravity of the work machine 1 by means of the data of the closed-loop control circuit or circuits in such a way that, firstly, the work machine 1 balances itself about the primary vehicle axle 3, and in one exemplary embodiment it can be additionally controlled in such a way that the load on the auxiliary wheel 6 is within a preselected load range, wherein this load is always significantly smaller than the load acting on the primary vehicle axle 3. The load should be so low here that rapid rotation of the vehicle about the primary axle 3 is not significantly impeded. In a preferred embodiment of the work machine 1, the data of the two closed-loop control circuits relating to self-balancing and to the load on the auxiliary wheel 6 are used by means of the controller. By means of the second control circuit which measures the load on the auxiliary wheel 5, in particular highly dynamic changes in the position of the center of gravity can be controlled better than with just one closed-loop control circuit which is intended to bring about self-balancing of the work machine 1 by means of semiconductor gyroscopes and acceleration sensors.

Figure 4B:
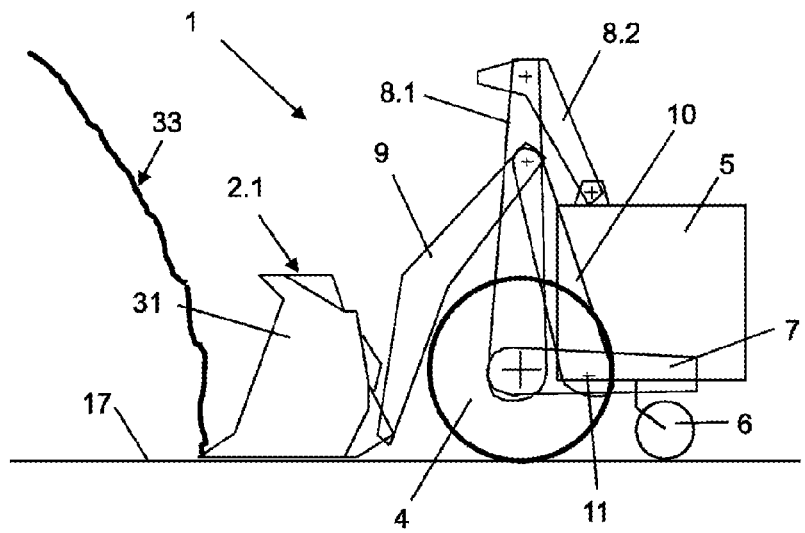

In FIG. 4b, the work machine 1 has arrived at a storage location with bulk material 33. In order to load the shovel 31 with the bulk material 33, the wheel elements 4 can now be positioned in a spatially fixed fashion relative to the bulk material 33 on both sides of the primary vehicle axle 3 by means of brake units (not illustrated). Furthermore, it is apparent in FIG. 4b that the shovel has been moved toward the underlying surface 17 for the loading process. In addition it is clear that the counterweight has been shifted by the controller in such a way that the auxiliary wheel 6 is now in contact with the underlying surface 17 and as a result can be used, for example, to absorb load peaks during the loading process. In a further exemplary embodiment, the auxiliary wheel 17 can also be moved toward the underlying surface 17 by adjusting the auxiliary wheel suspension 15.

Figure 4C:
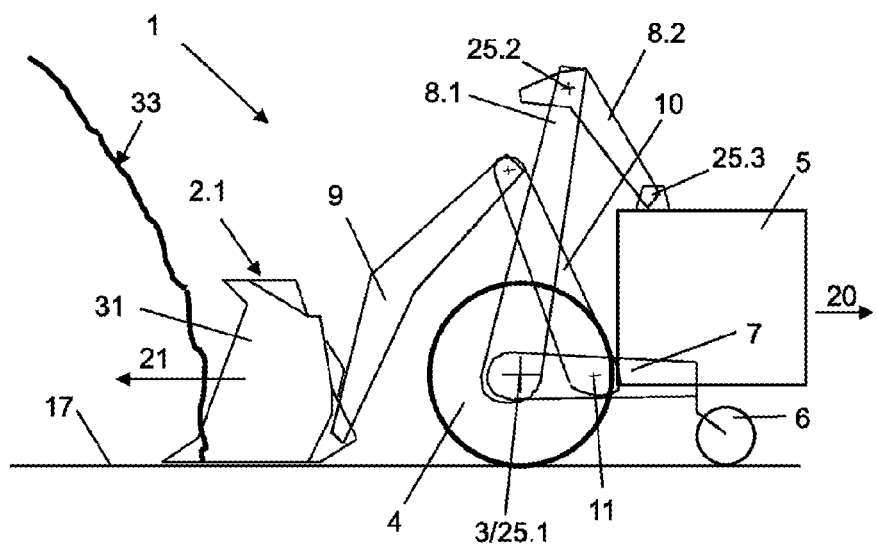

FIG. 4c illustrates the subsequent starting of the loading process of the shovel 31. In order to load the shovel with the bulk material 33, it is moved in the direction of the shovel movement 21. For this, the pivoting arm 10 is rotated about the pivoting arm rotational axis 11 toward the bulk material 33, so that the shovel 31 moves in the direction of the shovel movement 21 toward the bulk material 33. In order to compensate the resulting shifting of the center of gravity toward the shovel 31, the counterweight 5 is shifted away from the primary vehicle axle 3 in the direction of the counterweight movement 20, so that the center of gravity remains above the primary vehicle axle 3. For this, the lever elements 8.1 and 8.2 are pivoted relative to one another about the lever arm rotational axes 25.1 to 25.3 by means of drive elements (not illustrated). In the case of the drive elements for shifting the counterweight 5 by means of the lever elements 8.1 and 8.2 it is possible to use, for example, hydraulic elements such as hydraulic cylinders and/or electric motors. In a typical exemplary embodiment, the work machine 1 comprises a hydraulic controller for controlling the hydraulic elements which are used for shifting the position of the counterweight 5 for the lever elements 8.1 and 8.2, so that during the shifting of position in the direction of counterweight movement 20 the counterweight 5 can be held in an essentially horizontal attitude.

This provides the advantage that an energy store and/or a motor for converting energy can be arranged in the counterweight. The energy store and/or the motor for converting energy make available here the necessary energy for operating the work machine 1. The energy store comprises, for example, accumulators for storing electrical energy and/or hydraulic accumulators. The motor for converting energy is, for example, an internal combustion engine such as is known from the prior art, electric motors and/or hydraulic pumps.

In further exemplary embodiments (which are not illustrated) the counterweight 5 is connected to the base element 7 via a scissors element instead of the lever elements 8.1 and 8.2, or is arranged in a shiftable fashion on a linear bearing, wherein the linear bearing is preferably arranged on the base element 7 of the work machine 1. The linear bearing merely comprises, for example, rails on which the counterweight is movably arranged.

Figure 4D:
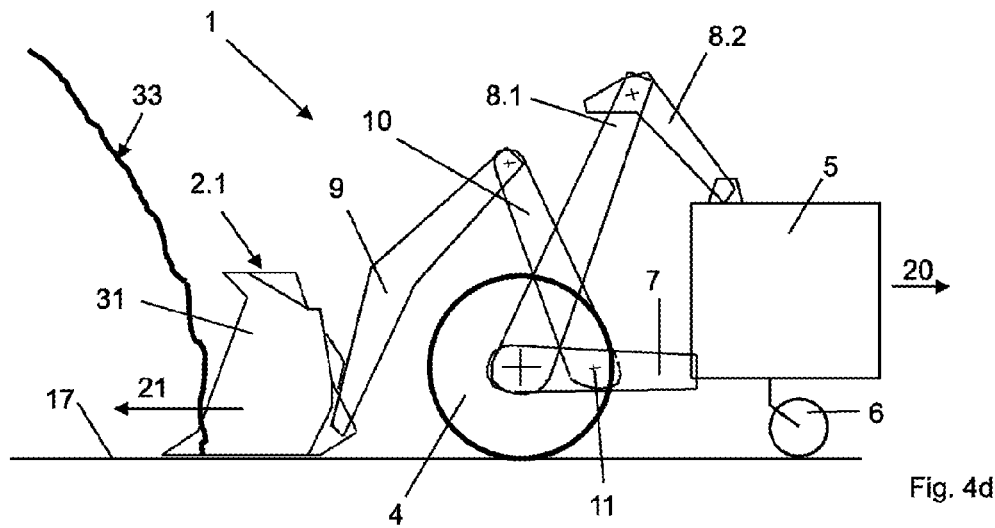
Figure 4E:
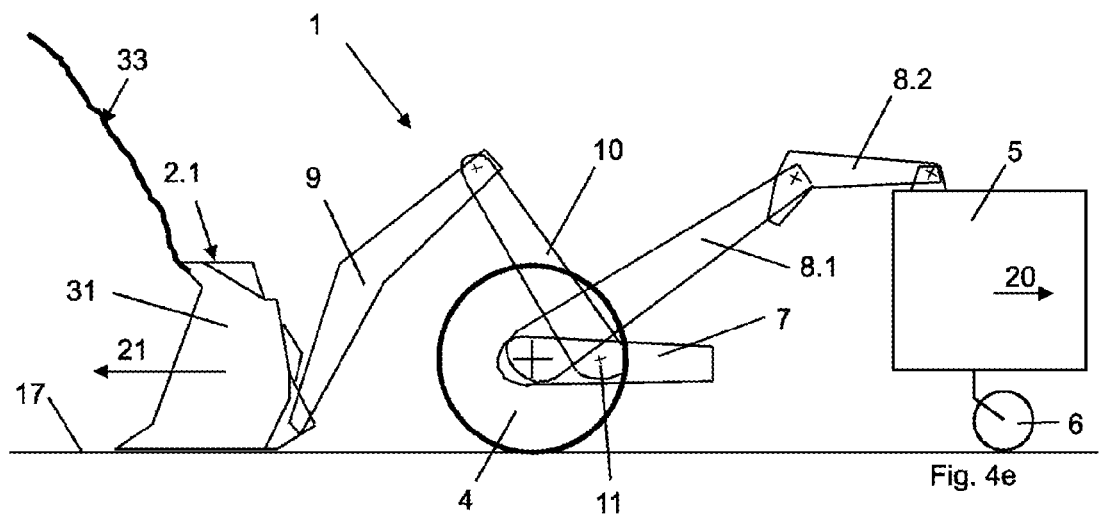

FIG. 4d shows that when the shovel 31 penetrates further in the direction of the shovel movement 21 into the bulk material 33 the counterweight 5 is also shifted in the direction of the counterweight movement 20 by the controller of the work machine. The working shovel 31 is pushed here into the bulk material in the direction of the shovel movement 21 by means of the drive elements which are assigned to the pivoting arm 10 and to the working arm 9, until, as illustrated in FIG. 4e, the shovel has completely penetrated the bulk material 33. With the continuous movement of the shovel 31 in the direction of the shovel movement 21, the counterweight 5 is also continuously pushed away from the primary vehicle axle 3 in the direction of the counterweight movement 20 by the controller of the work machine, so that the center of gravity of the vehicle remains above the primary axle 3.

Figure 4F:
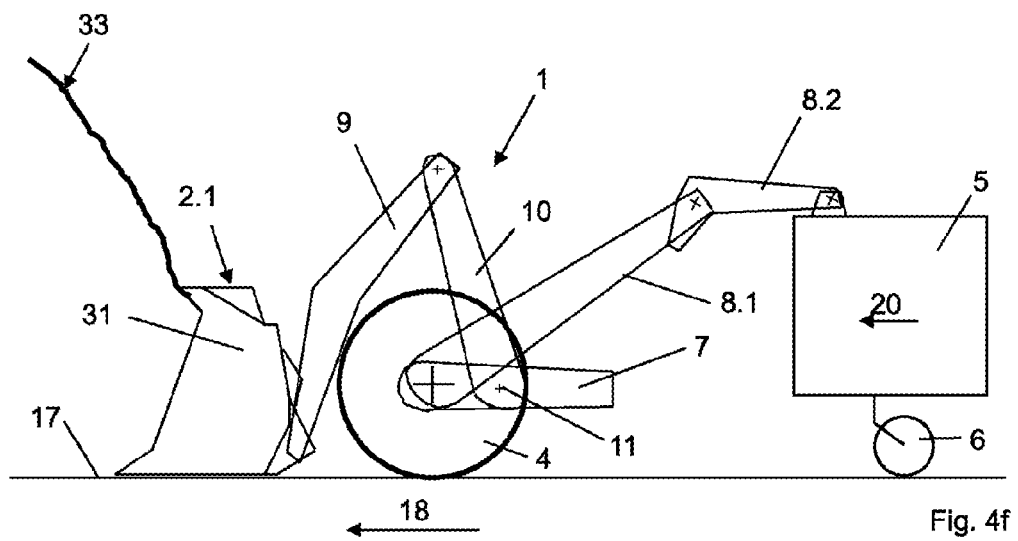
Figure 4G:
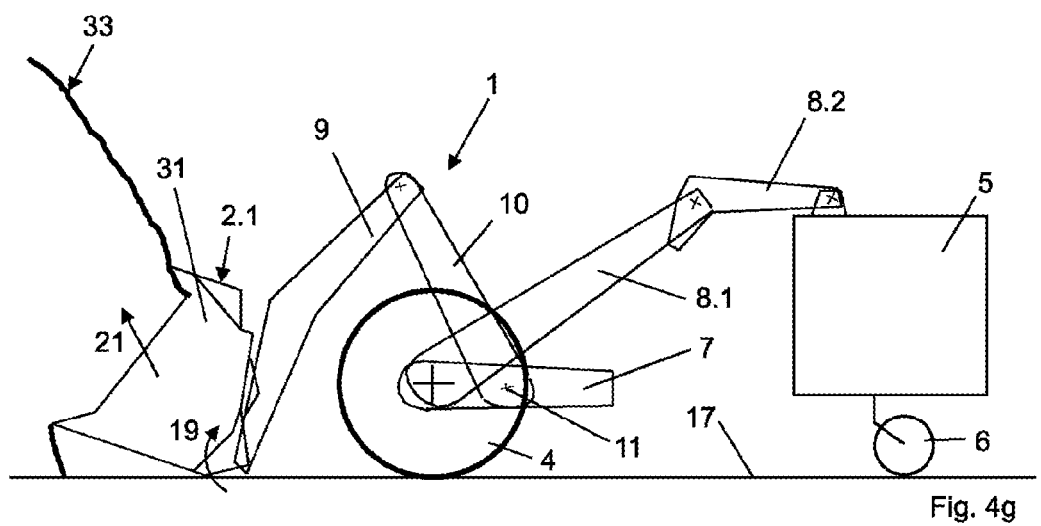

Subsequently, as illustrated in FIG. 4f, the brake units of the wheel elements 4 are released for the further loading process, so that the primary vehicle axle 3 can move with the wheel elements 4 in the travel direction 18 toward the shovel 31. In the exemplary embodiment which is shown, the distance of the counterweight from the primary vehicle axle 3 remains essentially constant here, so that a load which acts on the auxiliary wheel 6 rises. As a result, the center of gravity of the work machine 1 shifts away from the primary vehicle axle 3 toward the counterweight 5, in a range which can be controlled by the controller. This makes it possible to dispense with rapid and sudden shifting of the counterweight 5 if, as shown in FIG. 4g, the shovel is moved upward in the direction of the shovel movement 21 by movement of the pivoting arm 10 and of the working arm 9 and the rotation of the shovel in the direction of the shovel rotation 19, and the center of gravity of the work machine suddenly moves in the direction of the shovel 31 as a result of the bulk material 33 being taken up and the lifting up of the shovel 31 from the underlying surface 17.

This is also possible with the work machine 1 without an auxiliary wheel 6 and without an auxiliary wheel controller. However, it is necessary to ensure that the counterweight 5 can change its position very quickly. For this, in a typical exemplary embodiment, a work machine 1 has at least one hydraulic accumulator by which a high hydraulic pressure for adjusting the lever arms 8.1 and 8.2 can be made available more quickly than by hydraulic pumps and/or by a hydraulic accumulator which permits rapid unloading of the hydraulic elements through its ability to take up a hydraulic fluid.

Figure 4H:
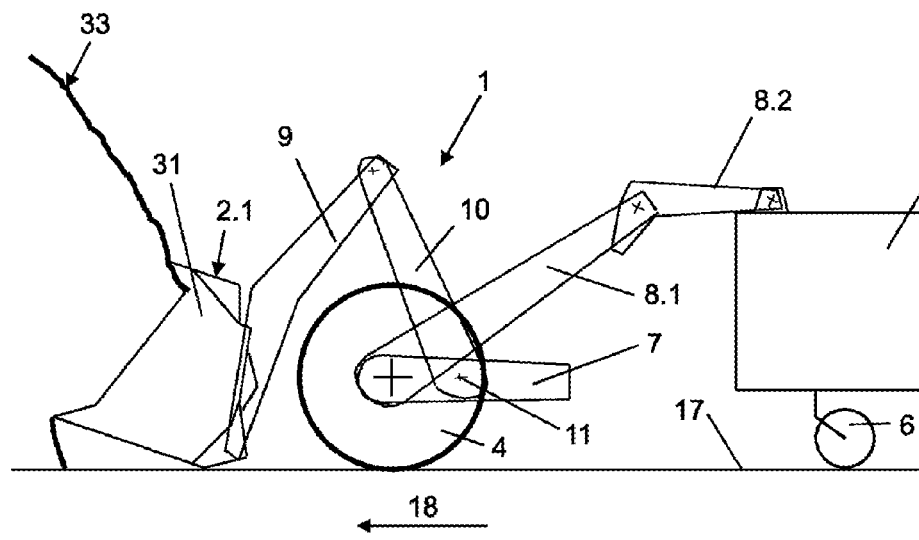
Figure 4I:
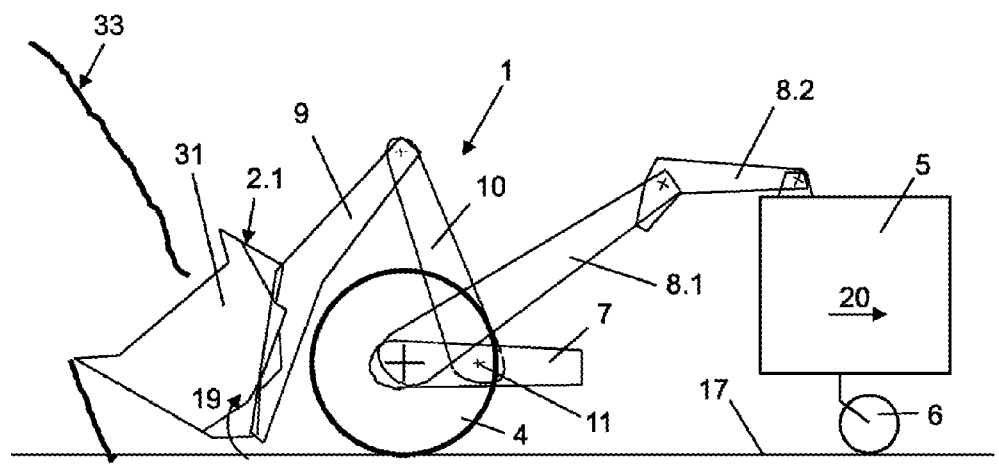

FIGS. 4h and 4i illustrate a continuation of the raising of the shovel 31, which is brought about by rotation of the shovel in the direction of the shovel rotation 19 and movement/pivoting of the working arm 9 and of the pivoting arm 10. In order to keep the center of gravity above the primary vehicle axle 3, the primary vehicle axle 3 of the work machine 1 is moved toward the shovel 31 in the travel direction 18 by means of the wheel elements 4, and the counterweight is moved away from the shovel 31 in the direction of the counterweight movement 20. The movement of the primary vehicle axle in the travel direction 18 and/or the movement of the counterweight 5 in the direction of the counterweight movement 20 occur/occurs here in each case toward or away from the primary vehicle axle 3, so that the center of gravity of the work machine 1 lies above the primary vehicle axle 3, or as far as a load can act on the auxiliary wheel 6, essentially above the primary vehicle axle 3, wherein in such an exemplary embodiment slight shifting of the center of gravity toward the counterweight 5 is permissible.

Figure 4J:
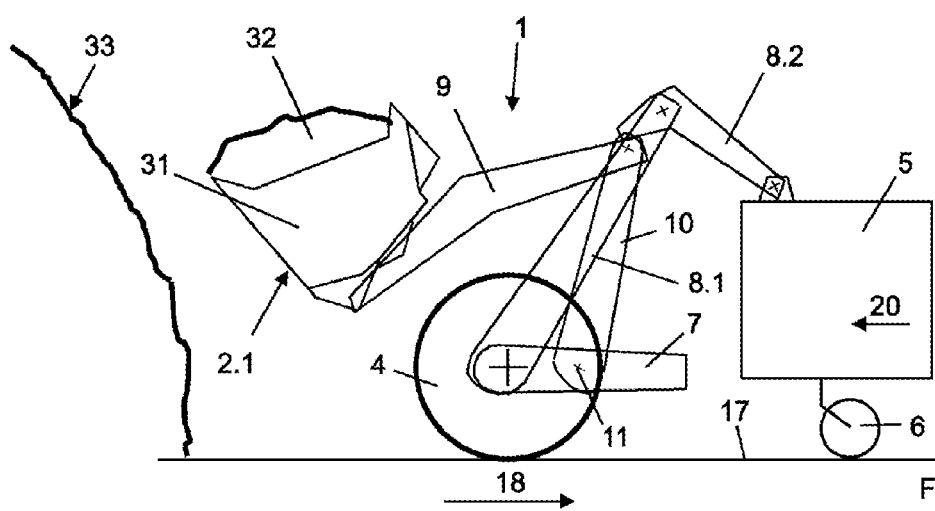
Figure 4K:
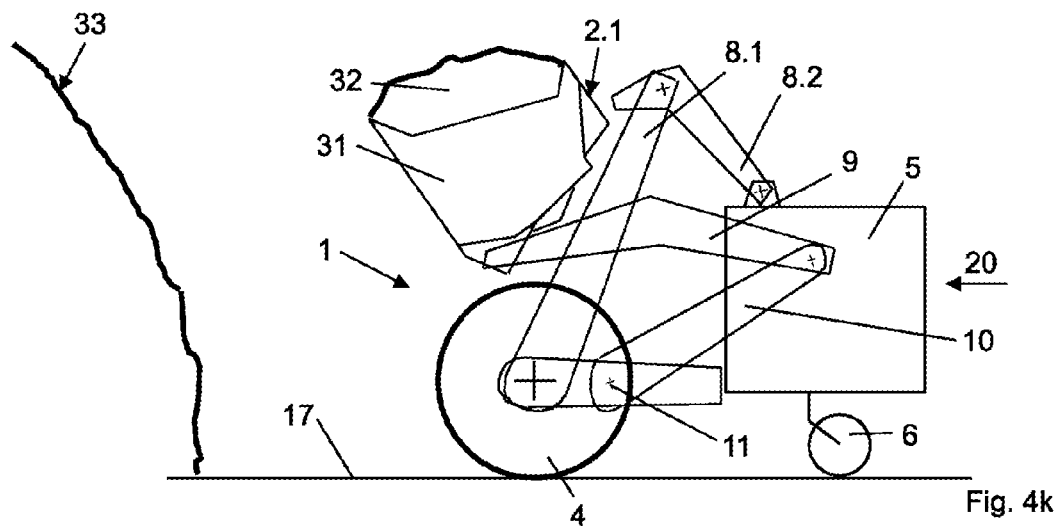

FIGS. 4j and 4k then illustrate how the shovel 31 is moved with the loaded material 32 by pivoting the pivoting arm 10 about the pivoting arm axis 11 toward the primary vehicle axle 3, and at the same time the counterweight 5 is also moved toward the primary vehicle axle 3. The movement of the counterweight 5 toward the primary vehicle axle 3 is carried out here, firstly, by means of the hydraulic controller (not illustrated) and the associated hydraulic elements as well as by means of a movement of the primary vehicle axle 3 toward the counterweight 5 by the wheel elements 4. In FIG. 4k, the work machine 1 is illustrated with a loaded shovel 31 in a travel position. By pulling the shovel 31 above the primary vehicle axle 3 it is possible here to provide a very short and maneuverable vehicle which is more agile than vehicles/work machines from the prior art.

FIGS. 5a to 5f then illustrate an unloading process of the shovel 31 of the work machine 1 of the exemplary embodiment of a work machine 1 according to FIG. 2.

Figure 5A:
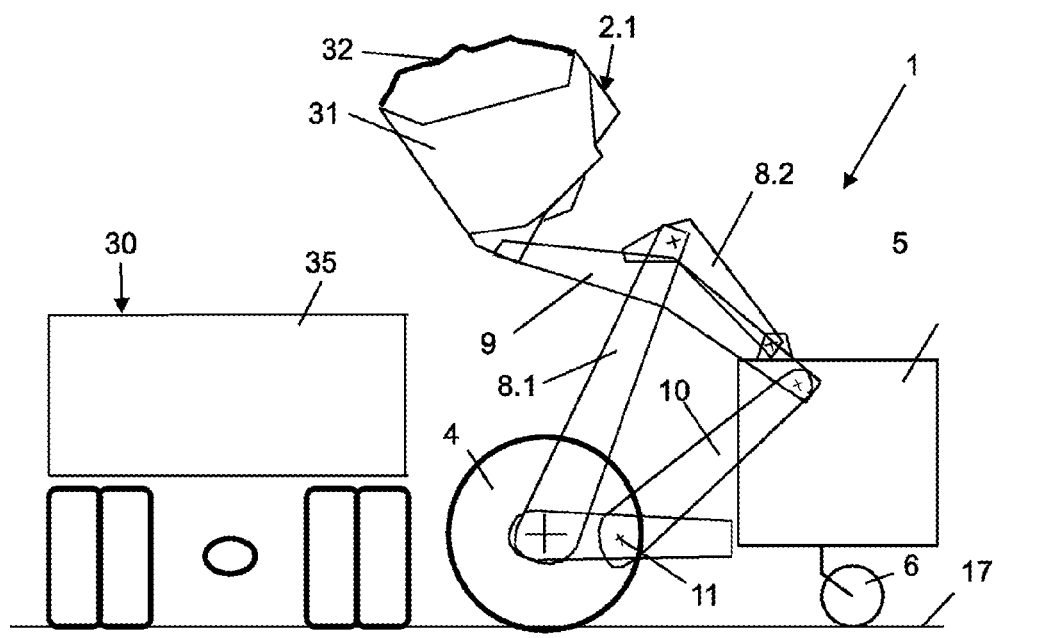
FIGS. 5a to 5f show a schematic illustration of an unloading process of a shovel of the work machine according to FIG. 2.
Figure 5B:
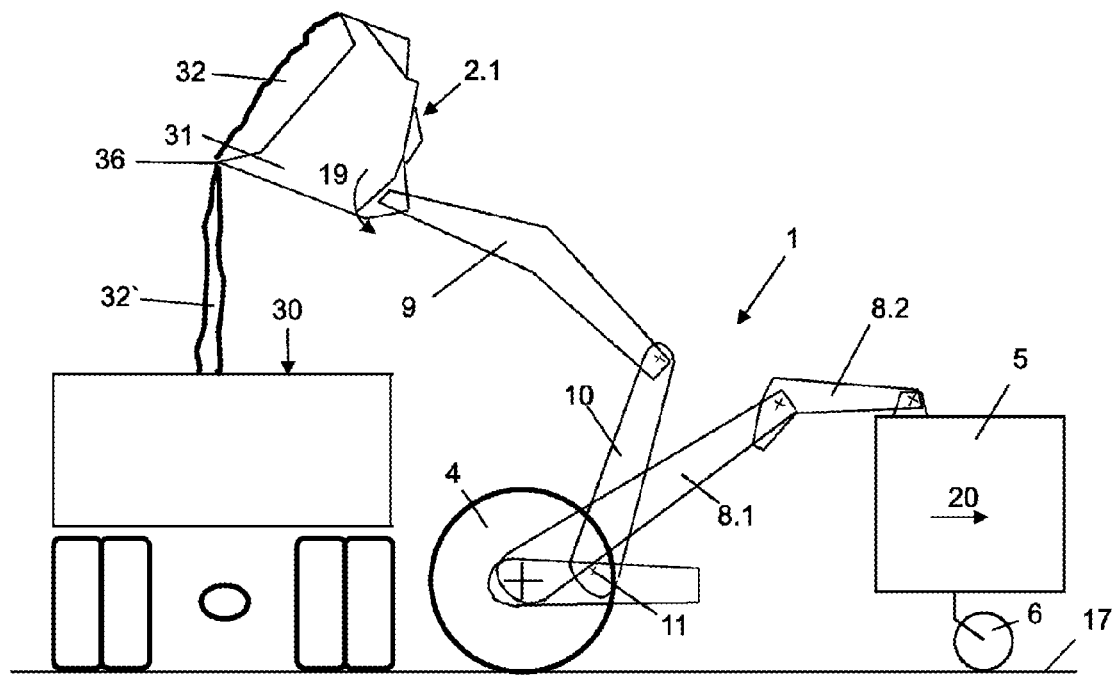
Figure 5C:
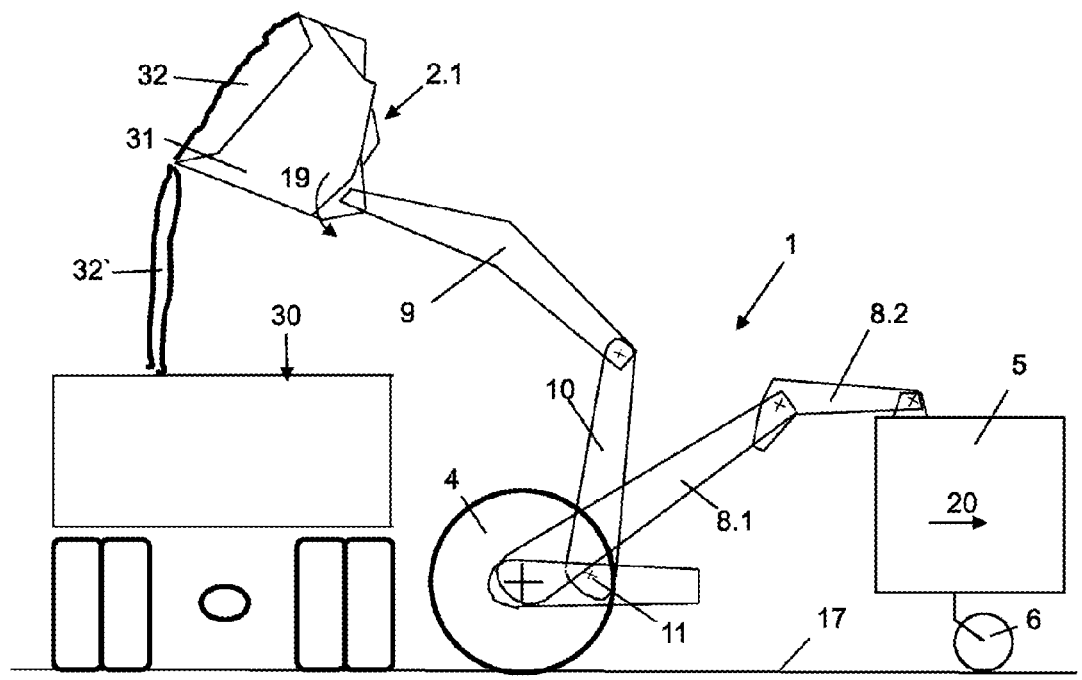
Figure 5D:
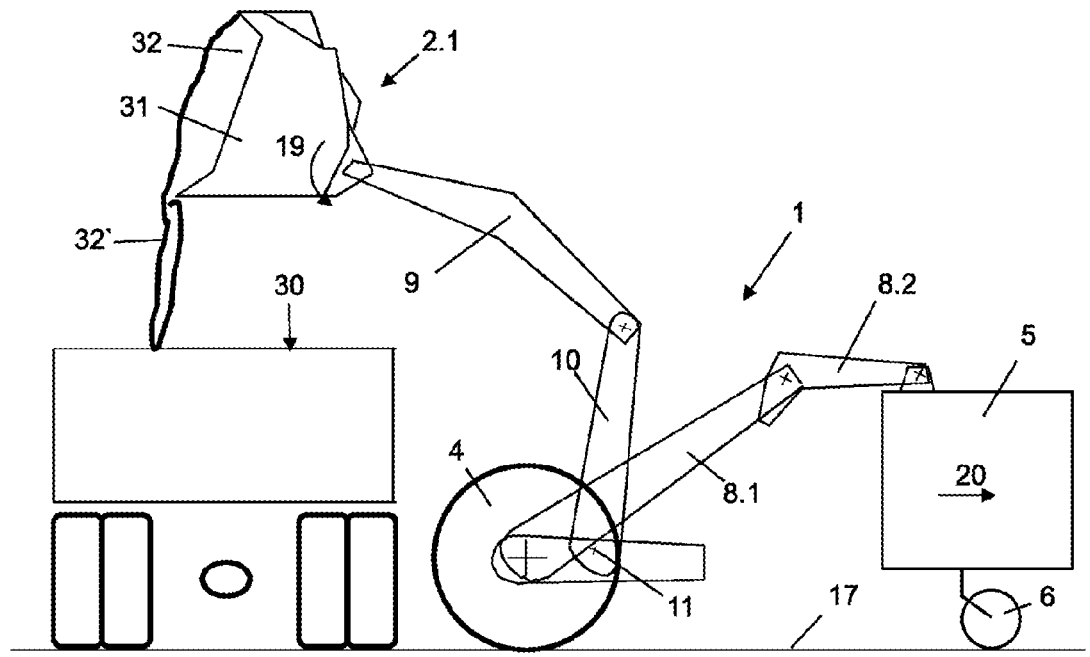
Figure 5E:
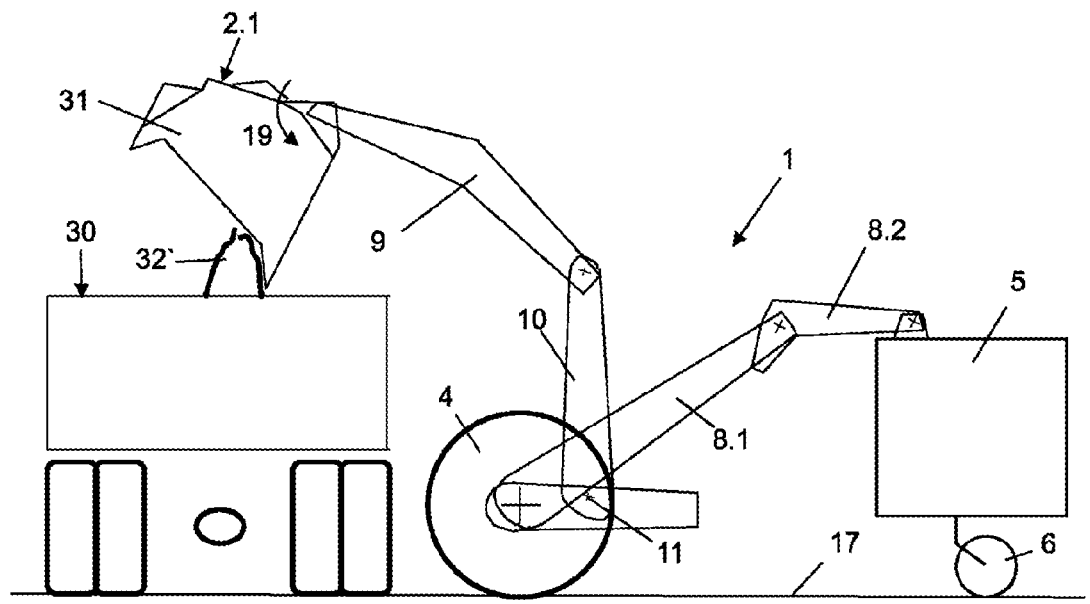
Figure 5F:
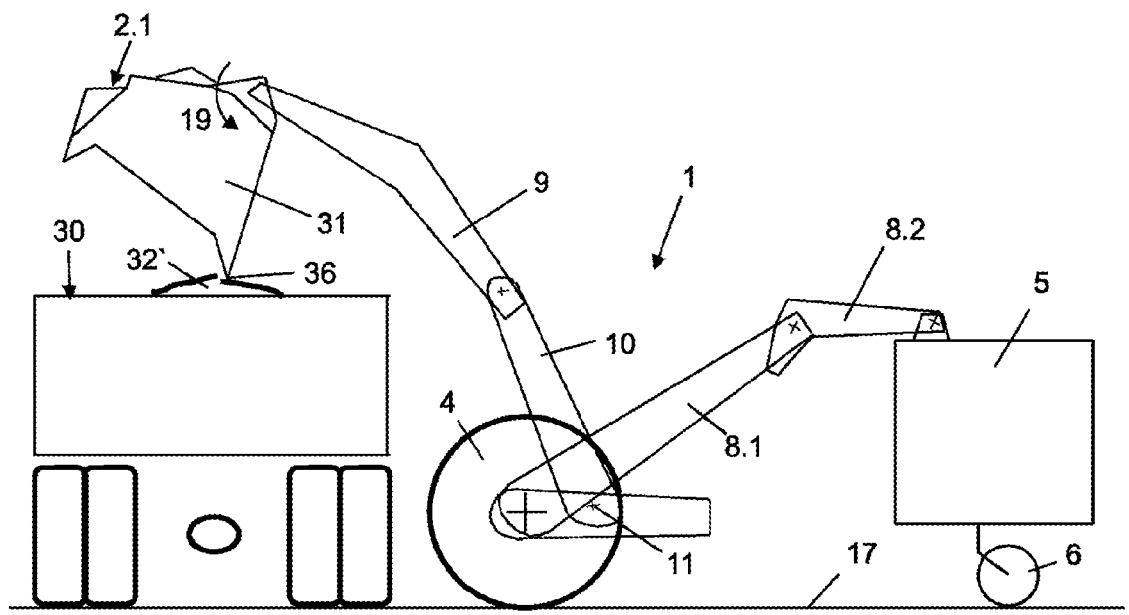

As illustrated in FIG. 5a, the work machine 1 firstly travels up to a transportation vehicle 30 before the primary vehicle axle 3 of the work machine 1 is held in a spatially fixed position relative to the transportation vehicle 30 by means of the brake units of the wheel elements 4. Then, the shovel 31 can be raised by means of the pivoting arm 10 and the working arm 9, so that said shovel 31 is located above a tail lift 35 of the transportation vehicle 30. The shovel 31 is then moved over a center of the transportation vehicle 30 by means of a movement/a pivoting of the pivoting arm 10 and/or of the working arm 9 as well as simultaneous rotation of the shovel 31 about the implement mount 24 in the direction of the shovel rotation 19. Through the rotation of the shovel 31 in the direction of the shovel rotation 19 the unloading process begins so that the loaded material 32 drops off into the transportation vehicle 30. In order to compensate the shifting of the center of gravity by the shifting of position of the shovel 31, the counterweight 20 is simultaneously moved away from the primary vehicle axle 3.

In addition, FIGS. 5b to 5f illustrate the further advantage of a work machine according to the invention which, as shown in the exemplary embodiment, is equipped with an implement 2.1 that the primary vehicle axle 3 of the work machine 1 can be held in a spatially fixed fashion in relation to the transportation vehicle 30 by means of the arrangement of the implement 2.1 (here the shovel 31) on the pivoting arm 10 and the working arm 9 can. The necessary movement of the shovel 31 so that the loaded material 32 can be tipped onto the loading face of the transportation vehicle 30 at the desired position is made possible by the two-part design of the connection between the base element 7 and the implement 2.1 by means of the pivoting arm 10 and the working arm 9. A shift of the center of gravity, which becomes smaller here, firstly, as a result of the shifting position of the shovel 31 and as a result of the decreasing load of the shovel 31, which becomes lower owing to the loaded material 32' dropping off, is compensated by shifting the counterweight 5 in a direction of the counterweight movement 20. In a typical exemplary embodiment, during such an unloading process care is taken to ensure that the shovel tip 36 is located essentially over a center of the transportation vehicle 30 so that the loaded material 32' is distributed statically uniformly on the loading surface. In the case of wheel loaders from the prior art, in order to do this the vehicle driver must, in addition to a shovel rotation 19, at the same time roll toward the transportation vehicle 30 so that the unloading process is also facilitated by the work machine 1 by the mounting of the implement 2.1 on the pivoting arm 10 and the working arm 9.

Figure 6:
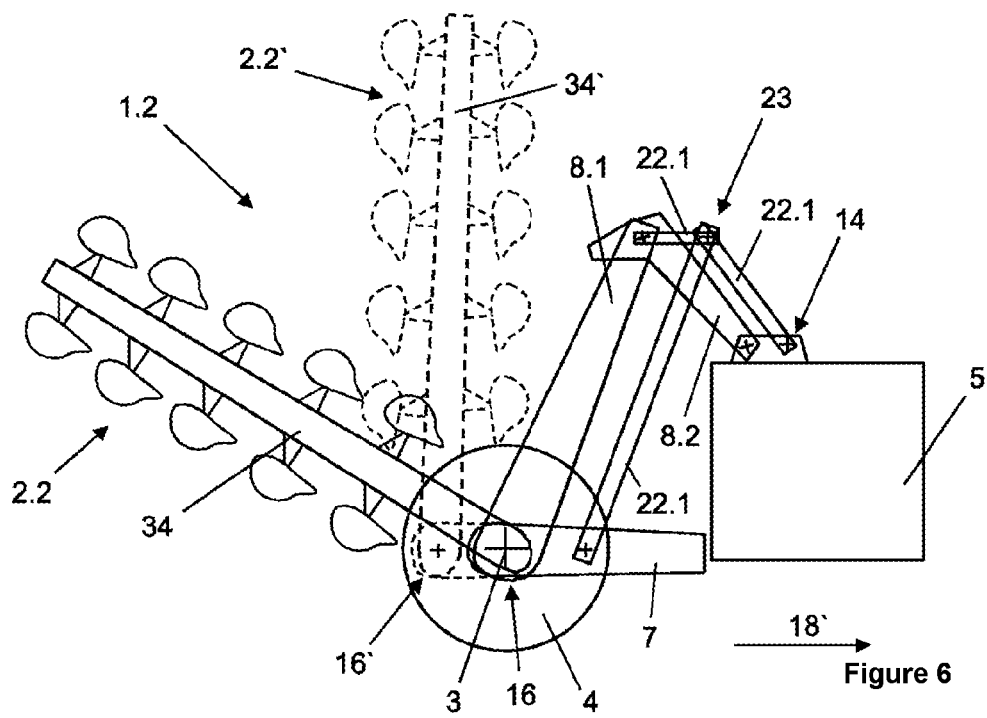
FIG. 6 shows a schematic illustration of a further exemplary embodiment of a work machine according to the invention.

Finally, FIG. 6 illustrates a further exemplary embodiment of a work machine 1.2 according to the invention. The work machine 1.2 according to the exemplary embodiment in FIG. 6 comprises a parallelogram guide 23 for the counterweight 5 so that, when shifting of the position of the counterweight 5 occurs it is held in an essentially horizontal attitude. For this purpose, the counterweight 5 is connected to the base element 7 in addition to the lever elements 8.1 and 8.2 with auxiliary lever elements 22.1 to 22.3. A parallelogram guide 23 ensures that when shifting of the position of the counterweight 5 occurs it is held in a position which corresponds to a position of the base element 7 which is held in an essentially horizontal attitude by the controller by means of the inclination sensors, acceleration sensors and/or load sensors.

Furthermore, the work machine 1.2 differs from the work machines 1 and 1.1 from the previous figures in that the work machine 1.2 comprises, instead of the implement, a mount 16, 16' for an implement 2.2, 2.2'. The implement 2.2 in the illustrated exemplary embodiment is a plow 34 such as is used in agriculture. In this context, all implements which are used in the construction industry and/or agriculture and require a carrier vehicle are conceivable as an implement 2.2 which is arranged on the mount 16.

The continuous lines illustrate a first possibility for a mount of an implement 2.2. Here, the mount 16 for the implement 2.2 in the region of the primary vehicle axle 3 and the implement 2.2 can be pivoted, for example, about the mount 16 or primary vehicle axle 3. In the exemplary embodiment which is illustrated in this way, the work machine 1.2 would be located in a position of rest here.

The dashed illustration illustrates a further possible mount 16' whose rotational axis is located outside the primary vehicle axle 3. The implement 2.2' is illustrated here in a transportation position so that the work machine 1.2 would move in the direction of the travel direction 18' provided that the counterweight 5 were arranged as illustrated.

Although only a few preferred exemplary embodiments of the invention have been described and illustrated, it is clear that the person skilled in the art can add numerous modifications or other implements without departing from the essence or scope of the invention.

LIST OF REFERENCE SYMBOLS

1 Work machine
2 Implement
3 Primary vehicle axle
4 Wheel element
5 Counterweight
6 Auxiliary wheel
7 Base element
8 Lever element
9 Working arm
10 Pivoting arm
11 Pivoting arm rotational axis
12 Implement rotational axis
13 Working arm rotational axis
14 Counterweight suspension
15 Auxiliary wheel suspension
16 Mount
17 Underlying surface
18 Travel direction
19 Shovel rotation
20 Counterweight movement
21 Shovel movement
22 Auxiliary lever movement
23 Parallelogram guide
24 Implement mount
25 Lever arm rotational axis
30 Transportation vehicle
31 Shovel
32 Loaded material
33 Bulk material
34 Plow
35 Tail lift
36 Shovel tip
50 Wheel loader
51 Articulated axle
52 Front axle
53 Rear axle
54 Shovel
55 Working arm
56 Rotational axis
57 Wheel
F Force

The invention claimed is:

1. A work machine (1, 1.1, 1.2) comprising:
   an implement (2, 2.1, 2.2) or a mount (16) for an implement,
   precisely one vehicle axle (3) arranged between the implement (2, 2.1, 2.2) or the mount (16) for the implement and a counterweight (5),
   wheel elements (4) which are arranged on both sides of the vehicle axle (3),
   drive units which are assigned to the wheel elements (4),
   at least one controller, wherein the controller comprises at least one closed-loop control circuit and brings about self-balancing of the work machine (1, 1.1, 1.2) about the vehicle axle (3), and
   wherein a position of the counterweight (5) relative to the vehicle axle (3) is controllable by means of the controller, so that by shifting the position of the counterweight (5) the work machine (1, 1.1, 1.2) can be balanced about the vehicle axle (3) and can be controlled in its movement directions, wherein the counterweight (5) comprises an energy store and/or a motor for converting energy.

2. The work machine (1, 1.1, 1.2) as claimed in claim 1, wherein the closed-loop control circuit is an electronic closed-loop control circuit and comprises at least inclination sensors and/or load sensors.

3. The work machine (1, 1.1, 1.2) as claimed in claim 1, wherein an auxiliary wheel (6) is arranged in and/or on the counterweight (5).

4. The work machine (1, 1.1, 1.2) as claimed in claim 1, wherein the wheel elements (4) comprise a brake unit.

5. The work machine (1, 1.1, 1.2) as claimed in claim 1, wherein the counterweight (5) is connected to a base element (7) at least via two lever elements (8.1, 8.2).

6. The work machine (1, 1.1, 1.2) as claimed in claim 1, further comprising a hydraulic controller or a parallelogram guide (23) for the counterweight (5), so that the counterweight (5) can be held in an essentially horizontal attitude during the shifting of position.

7. The work machine (1, 1.1, 1.2) as claimed in claim 1, wherein the counterweight (5) is connected to a base element (7) via a scissor element or is arranged in a displaceable fashion on a linear bearing.

8. The work machine (1, 1.1, 1.2) as claimed in claim 1, further comprising a control element, so that the work machine (1, 1.1, 1.2) has autonomous controllability or remote controllability.

9. The work machine (1, 1.1, 1.2) as claimed in claim 8, wherein the control element comprises cameras and/or sensor elements.

10. The work machine (1, 1.1, 1.2) as claimed in claim 1, wherein the implement is connected to a base element (7) via a working arm (9) and a pivoting lever (10).

11. The work machine (1,1.1,1.2) as claimed in claim 10, wherein the pivoting lever (10) is mounted on the base element (7) behind the vehicle axle (3).

12. The work machine (1,1.1,1.2) as claimed in claim 1, further comprises a pulse charging method.

13. The work machine (1, 1.1, 1.2) as claimed in claim 1, further comprising a hydraulic accumulator.

14. The work machine (1, 1.1, 1.2) as claimed in claim 1, wherein the implement (2, 2.1) is a shovel (31).

15. The work machine as claimed in claim 1, wherein the drive units comprise a separate drive unit for each of the wheel elements (4).

* * * * *